United States Patent
Dow et al.

(10) Patent No.: US 9,977,832 B2
(45) Date of Patent: May 22, 2018

(54) ELECTRONIC PERSONAL ASSISTANT PRIVACY

(71) Applicant: International Business Machines Corporation, Armonk, NY (US)

(72) Inventors: Eli M. Dow, Poughkeepsie, NY (US); James P. Gilchrist, Poughkeepsie, NY (US); Steven K. Schmidt, Essex Junction, VT (US); Charles J. Stocker, IV, Plainsboro, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 153 days.

(21) Appl. No.: 14/844,203

(22) Filed: Sep. 3, 2015

(65) Prior Publication Data
US 2016/0357970 A1    Dec. 8, 2016

Related U.S. Application Data

(63) Continuation of application No. 14/729,330, filed on Jun. 3, 2015.

(51) Int. Cl.
*G06F 21/60* (2013.01)
*G06F 17/30* (2006.01)
(Continued)

(52) U.S. Cl.
CPC .... *G06F 17/30864* (2013.01); *G06F 21/6245* (2013.01); *H04L 63/04* (2013.01);
(Continued)

(58) Field of Classification Search
None
See application file for complete search history.

(56) References Cited

U.S. PATENT DOCUMENTS

| 5,553,289 A | * | 9/1996 | Johnson | G06Q 10/107 |
| | | | | 713/100 |
| 5,699,370 A | * | 12/1997 | Kaniwa | G11B 15/087 |
| | | | | 348/460 |

(Continued)

FOREIGN PATENT DOCUMENTS

KR    20060056082    *    5/2006

OTHER PUBLICATIONS

Davies ("How private is Amazon Echo?", found at https://www.slashgear.com/how-private-is-amazon-echo-07354486, Nov. 2014).*

(Continued)

*Primary Examiner* — Peter Poltorak
(74) *Attorney, Agent, or Firm* — Cantor Colburn LLP; Steven Chiu

(57) ABSTRACT

A method comprises receiving a first user communication, accessing a directory entry associated with the user, accessing, by a processor, a database stored in a memory that includes content designated as private that is associated with the user in the directory, determining with the processor whether the first user communication includes content designated as private that is associated with the user, generating a second user communication by removing the content designated as private that is associated with the user from the first user communication, and sending the second user communication to an electronic personal assistant.

13 Claims, 5 Drawing Sheets

(51) Int. Cl.
*H04M 1/725* (2006.01)
*H04L 29/06* (2006.01)
*G06F 21/62* (2013.01)

(52) U.S. Cl.
CPC .......... *H04L 63/0421* (2013.01); *H04L 63/20* (2013.01); *H04M 1/72522* (2013.01)

(56) References Cited

U.S. PATENT DOCUMENTS

| | | | | |
|---|---|---|---|---|
| 6,360,222 | B1* | 3/2002 | Quinn | G06F 17/3089 |
| 6,442,616 | B1* | 8/2002 | Inoue | H04L 29/12311 |
| | | | | 455/432.1 |
| 6,611,846 | B1* | 8/2003 | Stoodley | G06F 19/322 |
| | | | | 705/3 |
| 6,678,822 | B1* | 1/2004 | Morar | G06Q 10/0875 |
| | | | | 705/29 |
| 8,255,948 | B1* | 8/2012 | Black | H04N 21/234336 |
| | | | | 709/219 |
| 8,756,666 | B1* | 6/2014 | Silva | G06F 21/34 |
| | | | | 713/172 |
| 2002/0104015 | A1* | 8/2002 | Barzilai | G06F 21/604 |
| | | | | 726/1 |
| 2002/0107930 | A1* | 8/2002 | Itoh | H04L 51/28 |
| | | | | 709/206 |
| 2003/0009465 | A1* | 1/2003 | Brown | G06F 17/30067 |
| 2003/0110381 | A1* | 6/2003 | Aoshima | G06F 21/31 |
| | | | | 713/168 |
| 2004/0117220 | A1* | 6/2004 | Chess | G06Q 30/02 |
| | | | | 705/64 |
| 2005/0256742 | A1* | 11/2005 | Kohan | G06F 19/322 |
| | | | | 705/2 |
| 2006/0230072 | A1* | 10/2006 | Partovi | G06F 19/322 |
| 2006/0270389 | A1* | 11/2006 | Maes | H04L 12/5895 |
| | | | | 455/414.1 |
| 2007/0073876 | A1* | 3/2007 | Shima | H04L 63/123 |
| | | | | 709/224 |
| 2007/0078953 | A1* | 4/2007 | Chai | H04L 65/403 |
| | | | | 709/219 |
| 2007/0250903 | A1* | 10/2007 | Furuichi | G06F 21/6245 |
| | | | | 726/1 |
| 2009/0049069 | A1* | 2/2009 | Aggarwal | H04L 63/0407 |
| 2009/0164395 | A1* | 6/2009 | Heck | G06F 17/30873 |
| | | | | 706/16 |
| 2009/0300699 | A1* | 12/2009 | Casagrande | H04N 5/76 |
| | | | | 725/116 |
| 2010/0257193 | A1* | 10/2010 | Krupka | G06F 17/30672 |
| | | | | 707/768 |
| 2010/0332484 | A1* | 12/2010 | Saito | G06F 21/6254 |
| | | | | 707/757 |
| 2011/0179075 | A1* | 7/2011 | Kikuchi | G06F 17/30011 |
| | | | | 707/769 |
| 2011/0317830 | A1* | 12/2011 | Richardson | H04N 21/4334 |
| | | | | 380/201 |
| 2013/0103682 | A1* | 4/2013 | Ghosh | G06F 11/0781 |
| | | | | 707/731 |
| 2014/0207442 | A1* | 7/2014 | Ganong, III | H04W 12/02 |
| | | | | 704/201 |
| 2014/0279485 | A1* | 9/2014 | Calman | G06Q 40/02 |
| | | | | 705/42 |
| 2014/0344953 | A1* | 11/2014 | Roundtree | G06F 21/10 |
| | | | | 726/28 |
| 2015/0347682 | A1* | 12/2015 | Chen | G06F 19/321 |
| | | | | 705/2 |
| 2016/0299976 | A1* | 10/2016 | Brunn | G06Q 50/01 |

OTHER PUBLICATIONS

Dow, Eli M., et al.; "Electronic Personal Assistant Privacy"; U.S. Appl. No. 14/729,330, filed Jun. 3, 2015.
List of IBM Patents or Patent Applications Treated as Related—Date Filed: Jun. 9, 2016; 1 page.

* cited by examiner

ELECTRONIC PERSONAL ASSISTANT PRIVACY

PRIORITY

This application is a continuation of and claims priority from U.S. patent application Ser. No. 14/729,330, filed on Jun. 3, 2015, entitled "ELECTRONIC PERSONAL ASSISTANT PRIVACY", the entire contents of which are incorporated herein by reference.

BACKGROUND

The present invention relates to electronic personal assistants, and more specifically, to electronic personal assistant privacy.

Portable electronic devices such as smartphones and tablets have incorporated electronic personal assistants that respond to verbal commands from a user. Many of the devices have microphones that are constantly receiving audio input which may include conversations of people proximate to the devices. The devices receive the audio input and process the audio to determine whether the audio includes verbal commands or requests from the user. Often these devices send the received audio as an audio file or as a text file following transcription to a cloud based server for processing. Following the processing the server may send a response to the user device for output to the user in an audio or visual format.

SUMMARY

According to one embodiment of the present invention, a method comprises receiving a first user communication, accessing a directory entry associated with the user, accessing, by a processor, a database stored in a memory that includes content designated as private that is associated with the user in the directory, determining with the processor whether the first user communication includes content designated as private that is associated with the user, generating a second user communication by removing the content designated as private that is associated with the user from the first user communication, and sending the second user communication to an electronic personal assistant.

According to another embodiment of the present invention, a method comprises receiving a first user communication from a user device, accessing a directory entry associated with the user, accessing with a processor a database stored in a memory that includes content designated as private that is associated with the user, determining with the processor whether the first user communication includes content designated as private that is associated with the user, and sending a message including permission for the user device to send the first user communication to an electronic personal assistant for processing responsive to determining that the first user communication does not include content designated as private that is associated with the user.

According to yet another embodiment of the present invention, a system comprises a database stored in a memory, a processor operative to, receive a first user communication, access a directory entry associated with the user, access the database that includes content designated as private that is associated with the user, determine whether the first user communication includes content designated as private that is associated with the user, generate a second user communication by removing the content designated as private that is associated with the user from the first user communication, and send the second user communication to an electronic personal assistant.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
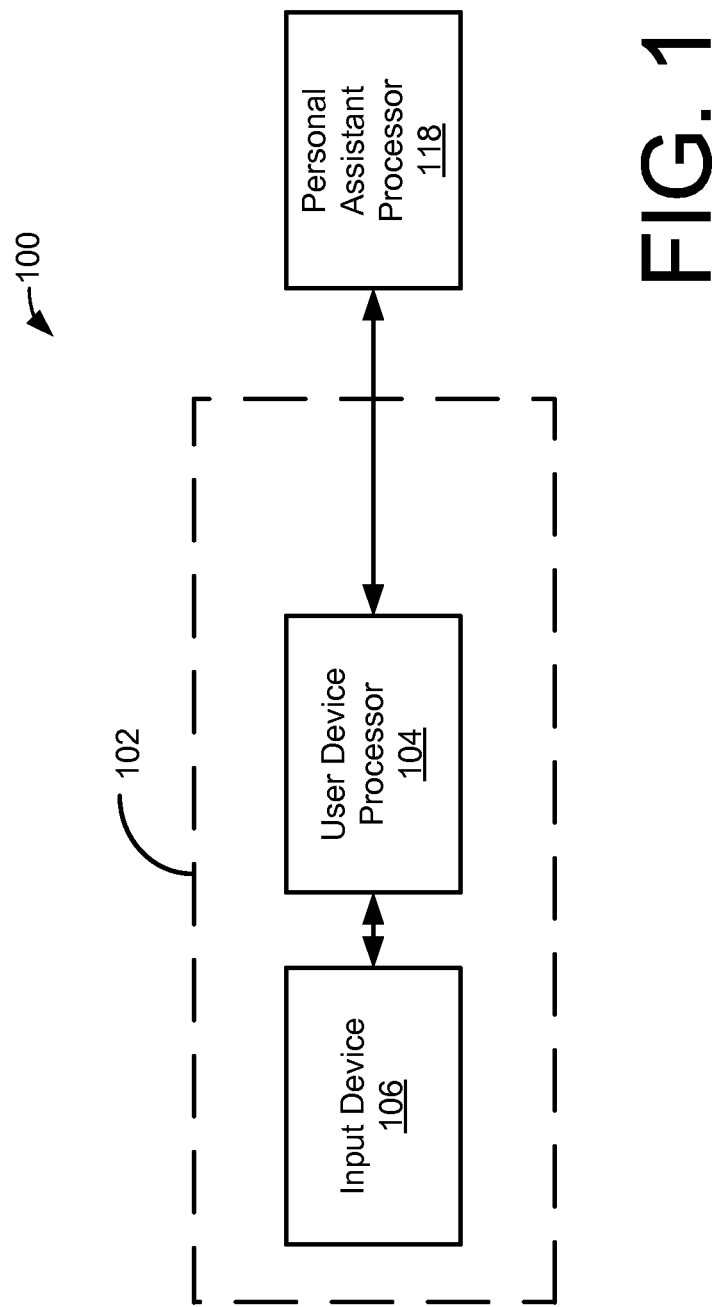
FIG. 1 illustrates an example of a system that includes a user device.

Electronic personal assistants in portable electronic user devices such as, for example, smartphones and tablets often constantly receive audio input that is sent from the device to a server for processing. FIG. 1 illustrates an example of a system 100 that includes a user device 102 such as a smartphone that includes a processor 104 and an input device 106 that may include a microphone. The user device 102 is communicatively connected to a personal assistant processor (server) 118 that performs electronic personal assistant logic.

For example, the user device 102 may constantly monitor audio using a microphone. When the user device receives relevant audio such as, for example, "What's the weather tomorrow?" the user device may use voice recognition to convert the recorded audio to a text file and send the text file and/or the audio file to the personal assistant processor 118. The personal assistant processor 118 processes the file and finds an answer to the question. The personal assistant processor 118 then sends an answer to the question to the user device 102 for presentation to the user. In the system 100, the user device 102 may constantly monitor ambient audio. Thus, personal and private conversations may be recorded by the user device 102 and sent to the personal assistant processor 118. This presents a privacy and security concern for users and organizations. Indeed, many organizations control the presence of smartphones in meeting rooms to avoid the possibility or private conversations being recorded by the device and being sent to a third party owned personal assistant processor 118.

The embodiments described below can be used to allow an individual or organization to prevent private information recorded by a user device from being sent to a third party personal assistant server or processor.

Figure 2:
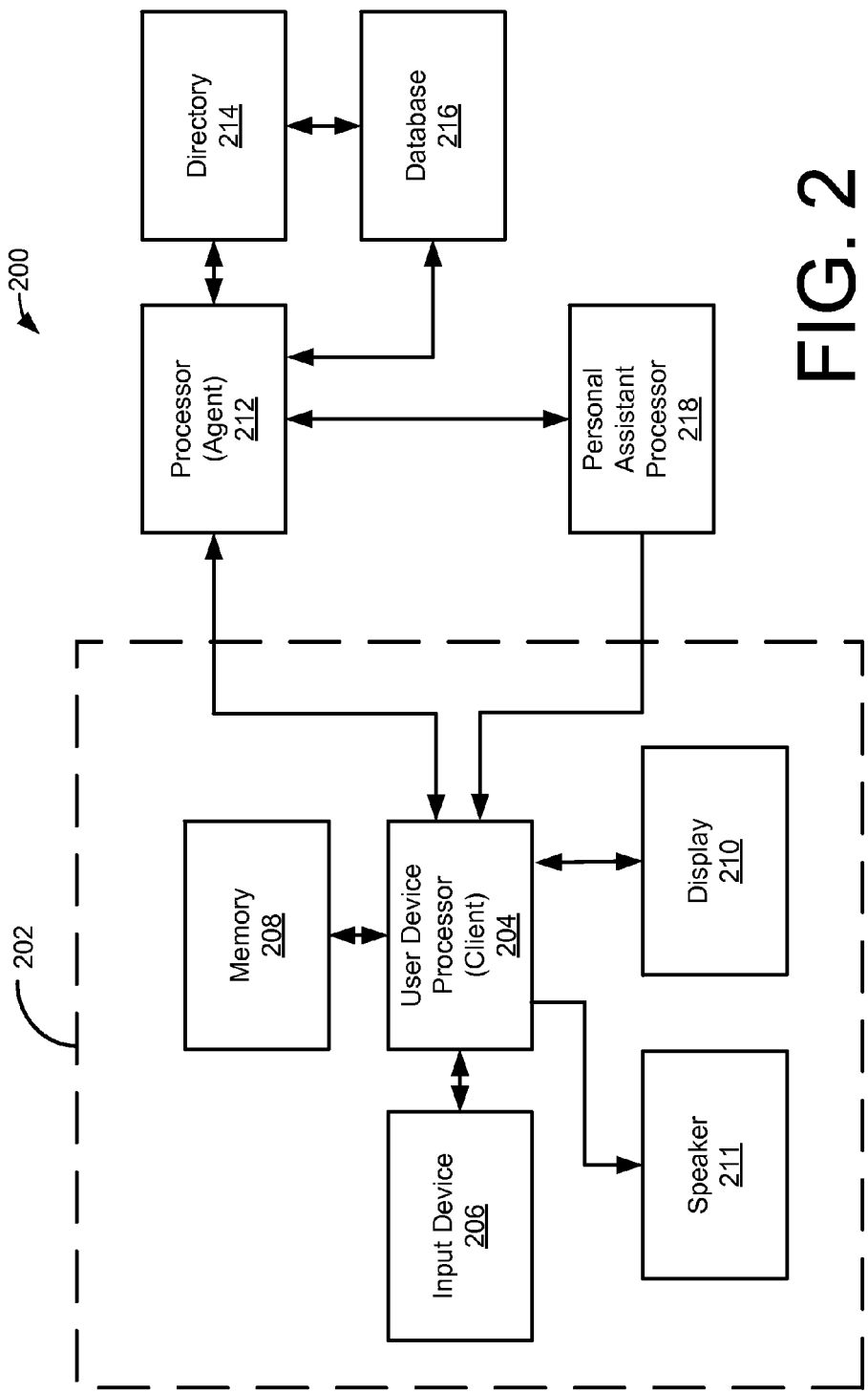
FIG. 2 illustrates a block diagram of an exemplary embodiment of a system for electronic personal assistant privacy.

FIG. 2 illustrates a block diagram of an exemplary embodiment of a system 200 for electronic personal assistant privacy. The system 200 includes a user device 102 that may be implemented, for example, by a smartphone, tablet, personal computer, or other electronic processing device. The user device 202 shown in FIG. 2 includes a user processor (client processor) 204 that is communicatively connected to an input device 206 that may include for example, a microphone, touch screen, keyboard, or camera. The processor 104 is communicatively connected to a memory 208 and a display 210. The system 200 also includes a processor (agent) 212 that is communicatively connected to the user device 202. The agent 212 is communicatively connected to a directory 214 and a database 216. A personal assistant processor 218 may be communicatively connected to the user device 104 and the agent 112.

The personal assistant processor 218 is a server that performs electronic personal assistant logic. Often, the personal assistant processor 218 is owned by a party not associated with the user. In operation, the personal assistant processor 218 receives an audio or text file, processes the file and sends a result to the user device 202 for presentation to the user via, for example, the display 210 or via a speaker 211. The personal assistant processor 218 may also include a function of receiving an audio, text, or digital file from one or more users and producing a textual transcript of the file.

In the illustrated system 200, when the user device 202 processes an input such as, for example, a recorded audio file with words spoken by the user, to be sent to the personal assistant processor 218, the user device 202 sends the processed input to the agent 212. The agent 212 processes the input to determine whether the input includes any private information. The agent 212 may then filter the input as described below to remove the personal information prior to sending the input to the personal assistant processor 218. The agent 212 may in other embodiments for example, replace, obfuscate or substitute other words, characters or symbols for the personal information prior to sending the input to the personal assistant processor 218. This reduces the chances of private information being sent to an unsecure third party.

The agent 212 in the illustrated embodiment is a server with a processor that uses, for example, a directory access protocol to identify and associate private data and content with a particular user in an organization. The directory 214 is used to identify a unique identifier of the user and, using a hierarchical system, determine what data is designated as private for the user. For example, an organization may use confidential project names when referring to projects. If a particular user was associated in the directory 214 with a project named "peach tree" the word "peach tree" may be entered into the database 216 and associated with anyone on the project team as a private term. Members of a second team that is not associated with the peach tree project would not be associated with the "peach tree" private term. Thus, in a large organization, the particular private terms are only associated with users who could use the term in a sensitive context. In this example, if the agent 212 received a file from a member of the peach tree team that included the term "peach tree" the agent 212 could filter the term "peach tree" from the file prior to sending the file to the personal assistant processor 218, thereby maintaining confidentiality since a member of the peach tree team who used the term peach tree would likely be talking about private information. On the other hand, if a member of the second team, which is not associated with the peach tree team said, for example, "where do peach trees grow," the term "peach tree" would not be filtered out of the file since the term "peach tree" is not designated as private for members of the second team.

Figure 3:
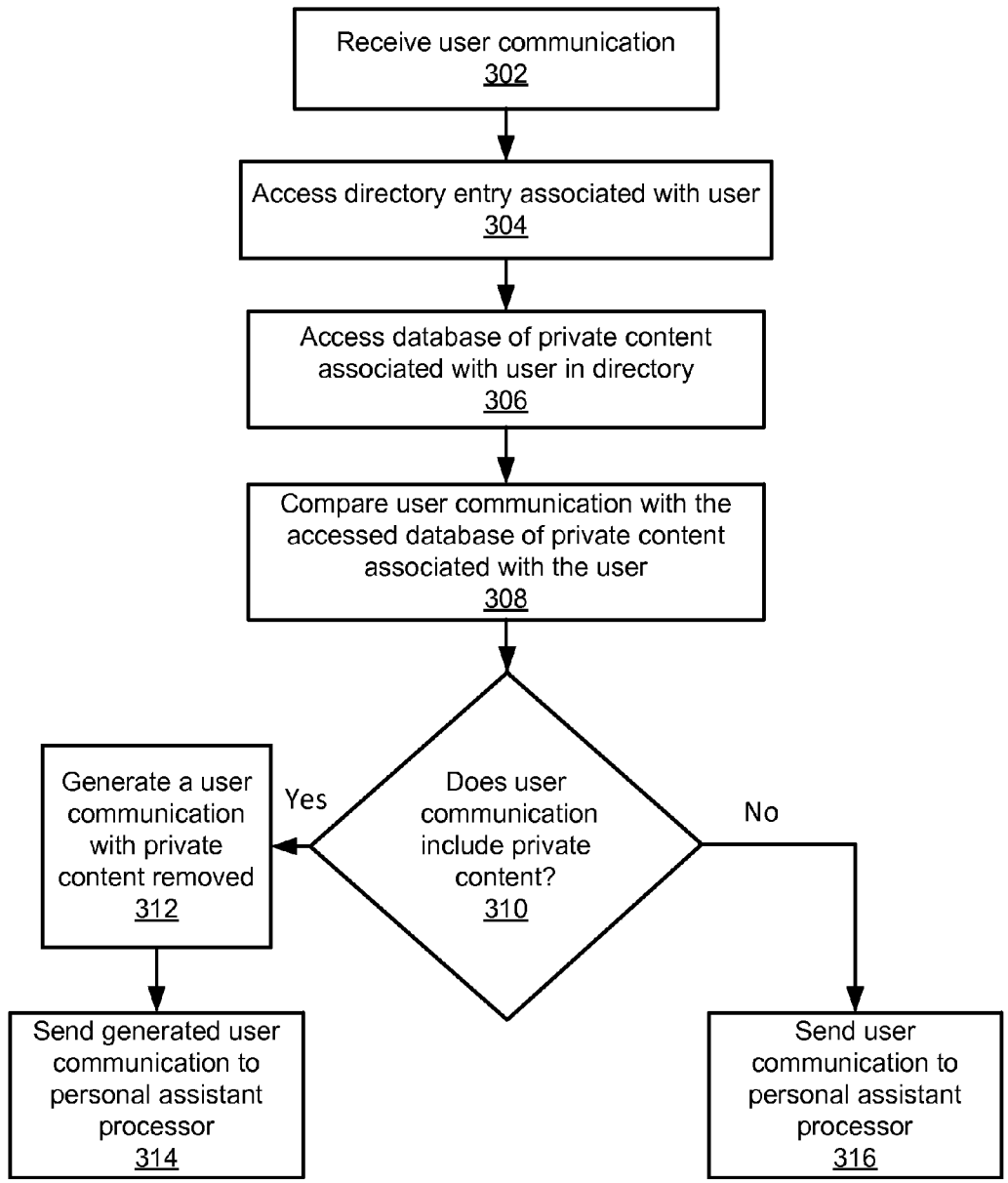
FIG. 3 illustrates a block diagram of an exemplary method of operation of the system of FIG. 2.

FIG. 3 illustrates a block diagram of an exemplary method of operation of the system 200 (of FIG. 2). In block 302 the agent processor (agent) 212 receives a user communication. The user communication may include, for example, a unique identifier of the user and an audio file with words spoken by the user that has been recorded by the user device (client) 204 and geographical or location information indicating the location where the user communication is generated. The user communication may also or alternatively include, a file including text that was entered by the user, or was generated using voice recognition logic to convert recorded spoken words into a written transcript. In other alternate embodiments, the user communication may be formatted into a binary or packed data structure. In block 304 the agent 212 accesses a directory entry associated with the user in the directory 214. The agent 212 accesses the database 216 which contains a list of private content such as words in text format that are associated with the user in block 306. In some embodiments, the database may include a list of private content that is associated with the user and a location of the user (i.e., the geographical location where the communication is generated) such that words may be designated private when the communication was generated in a particular location associated with particular private content. In block 308, the agent 212 compares the user communication with the designated private words associated with the user in the database 216. In block 310, the agent 212 determines whether any designated private words are present in the user communication. If yes, the agent 212 generates a second user communication that is similar to the first user communication, but does not include the private words in block 312. In block 314, the agent 212 sends the generated user communication to the personal assistant processor 218. The personal assistant processor 218 may then process the user communication and return a result to the user device 202. A result may include, for example, an answer to a question input by the user such as a location of a nearest hotel. In block 310, if the agent 212 determines that no designated private words are present in the user communication, the agent may send the original user communication to the personal assistant processor 218 for processing.

Figure 4:
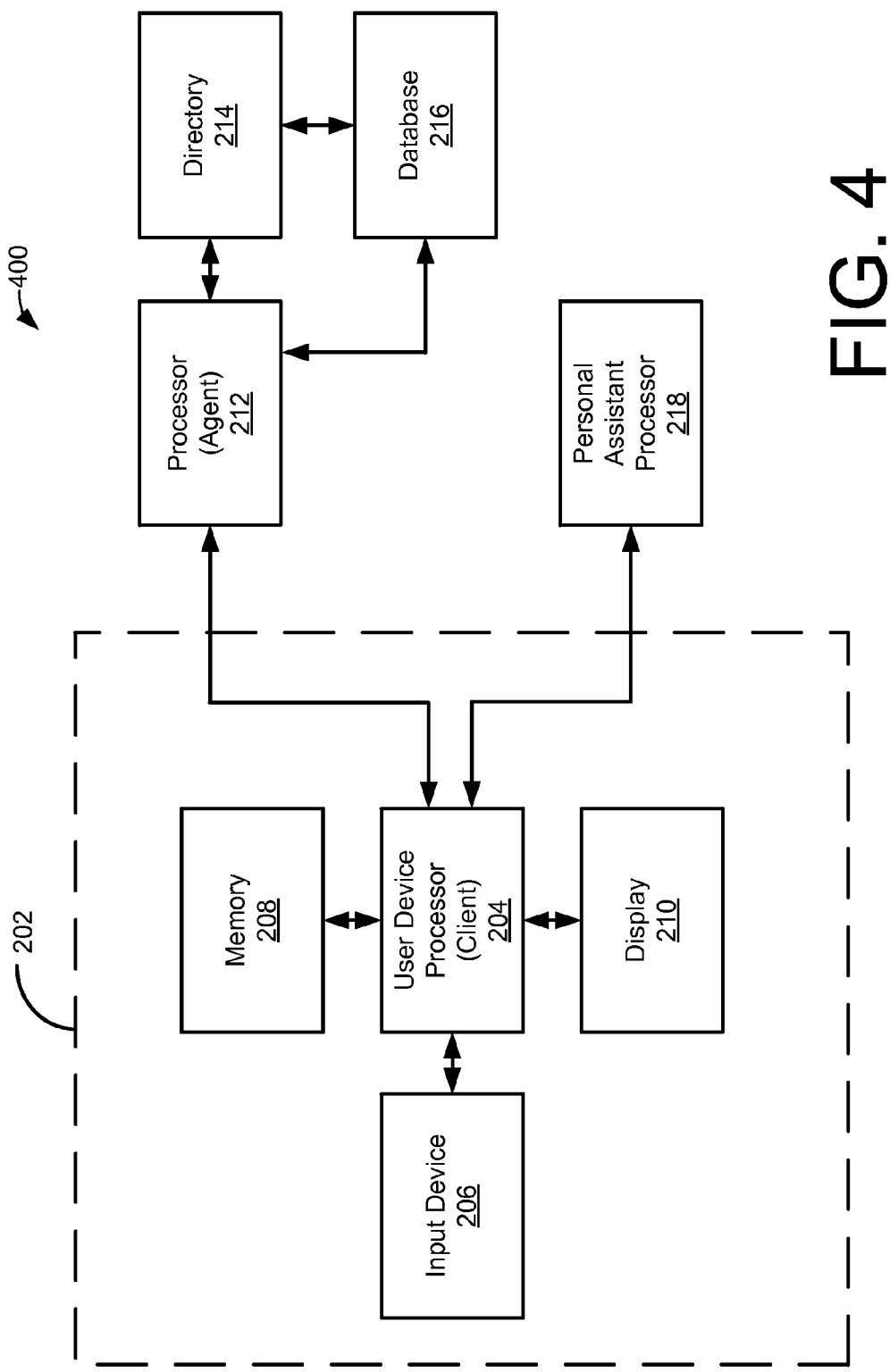
FIG. 4 illustrates an alternate exemplary embodiment of a system for electronic personal assistant privacy.

FIG. 4 illustrates an alternate exemplary embodiment of a system 400. The system 400 is similar to the system 200 (of FIG. 2) however; the personal assistant processor 218 is not communicatively connected to the agent 212.

Figure 5:
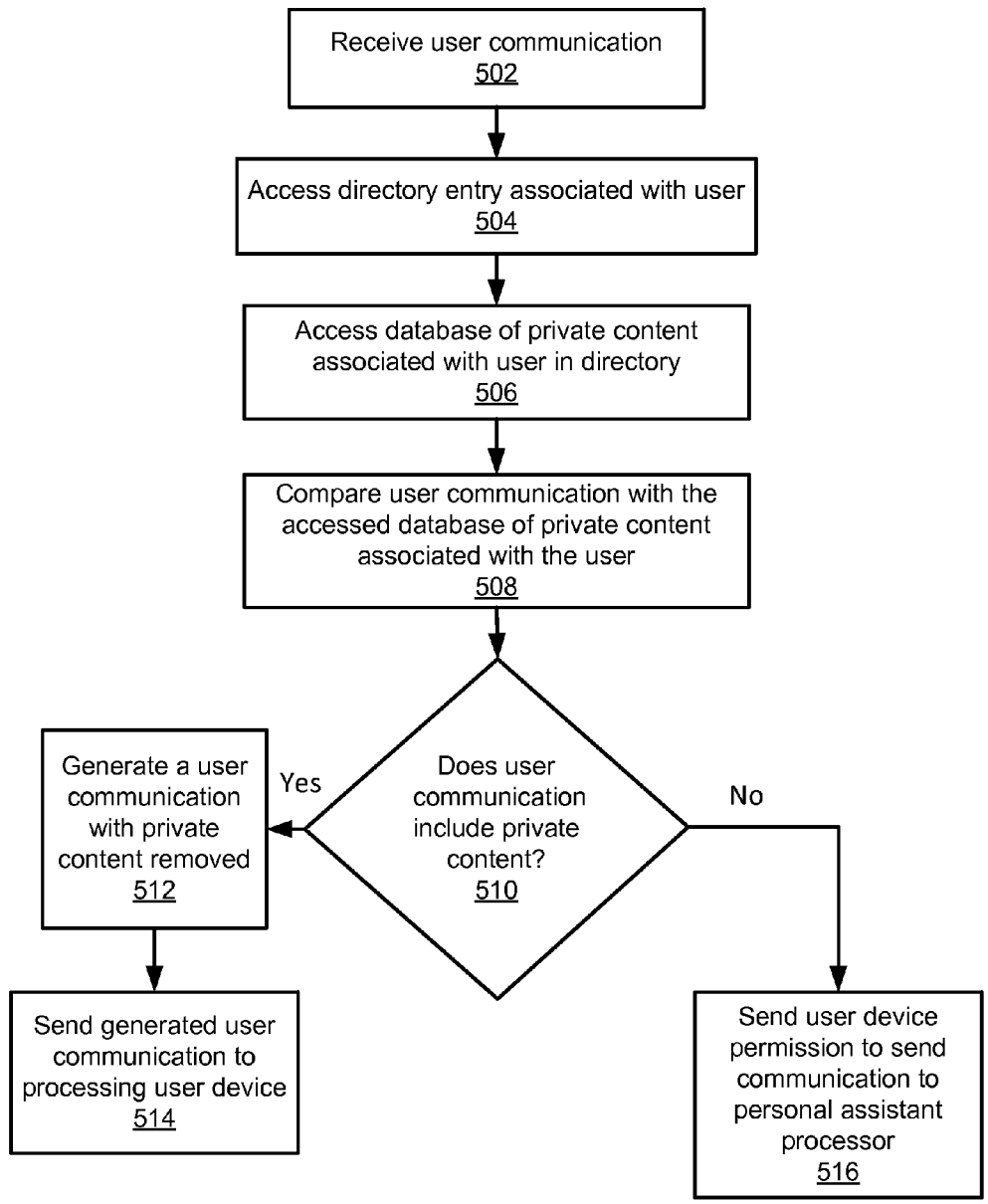
FIG. 5 illustrates a block diagram of an exemplary method of operation of the system of FIG. 4.

FIG. 5 illustrates a block diagram of an exemplary method of operation of the system 400 (of FIG. 4). In block 502 the agent processor (agent) 212 (of FIG. 4) receives a user communication. In block 504 the agent 212 accesses a directory entry associated with the user in the directory 214. The agent 212 accesses the database 216 containing a list of private content such as words in text format that are associated with the user in block 506. In block 508, the agent 212 compares the user communication with the designated private words associated with the user in the database 216. In block 510, the agent 212 determines whether any designated private words are present in the user communication. If yes, the agent 212 generates a second user communication that is similar to the first user communication, but does not include the private words in block 512. In block 514, the agent 212 sends the generated user communication to the personal assistant processor 218. Referring to block 510, if no, in block 516, the agent 212 sends permission to the user device to send the communication to the personal assistant processor 218. The permission may include, for example, an identifier of the user communication, or the user communication with an indication that the user device has permission to send the communication to the personal assistant processor 218.

Though the illustrated embodiments include the use of an agent processor 212 that is communicatively connected to the directory 214 and the database 216, in alternate embodiments, the functions of the agent 212 may be performed by, for example, the user device processor 204.

Technical effects and benefits of embodiments described herein include preserving the privacy of the user or an organization while allowing a user device to interact with an electronic personal assistant.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving a first user communication;
   accessing a directory entry associated with the user;
   accessing, by a processor, a database stored in a memory that includes content designated as private that is associated with the user in the directory;
   determining with the processor whether the first user communication includes content designated as private that is associated with the user;
   generating a second user communication by removing the content designated as private that is associated with the user from the first user communication; and
   sending the second user communication to an electronic personal assistant,
   wherein the first user communication includes geographic data that includes a location from where the first user communication is sent, wherein the database includes content designated as private that is associated with the location from where the first user communication is sent in the directory.

2. The method of claim 1, further comprising sending the first user communication to an electronic personal assistant for processing responsive to determining that the first user communication does not include content designated as private.

3. The method of claim 1, wherein the first user communication includes a unique identifier of the user.

4. The method of claim 1, wherein the first user communication includes a textual communication.

5. The method of claim 1, wherein the directory uses a directory access protocol.

6. The method of claim 1, wherein the electronic personal assistant is operative to receive the first communication, process the communication, and return a result to the first user.

7. The method of claim 1, wherein the first user communication is received from a user device.

8. A method comprising:
   receiving a first user communication from a user device;
   accessing a directory entry associated with the user;
   accessing with a processor a database stored in a memory that includes content designated as private that is associated with the user;
   determining with the processor whether the first user communication includes content designated as private that is associated with the user; and
   sending a message including permission for the user device to send the first user communication to an electronic personal assistant for processing responsive to determining that the first user communication does not include content designated as private that is associated with the user,
   generating a second user communication by removing the content designated as private that is associated with the user from the first user communication; and
   sending the second user communication to an electronic personal assistant;
   wherein the first user communication includes geographic data that includes a location from where the first user communication is sent, wherein the database includes content designated as private that is associated with the location from where the first user communication is sent in the directory.

9. The method of claim 8, wherein the first user communication includes a unique identifier of the user.

10. The method of claim 8, wherein the first user communication includes a textual communication.

11. The method of claim 8, wherein the directory uses a directory access protocol.

12. The method of claim 8, wherein the electronic personal assistant is operative to receive the first communication, process the communication, and return a result to the first user.

13. The method of claim 8, wherein the first user communication is received from a user device.

* * * * *